United States Patent [19]

Short, III

[11] Patent Number: 4,607,258
[45] Date of Patent: Aug. 19, 1986

[54] RADAR VIDEO DEHANCER

[75] Inventor: Robert D. Short, III, Littleton, Mass.

[73] Assignee: Sperry Corporation, New York, N.Y.

[21] Appl. No.: 474,076

[22] Filed: Mar. 10, 1983

[51] Int. Cl.⁴ .......................... G01S 7/28; G01S 13/00
[52] U.S. Cl. .............................. 343/17.1 R; 343/5 SW
[58] Field of Search ............. 343/5 CF, 5 CE, 5 SW, 343/7 A, 17.1 R, 5 VQ; 328/127

[56] References Cited

U.S. PATENT DOCUMENTS

| | | | |
|---|---|---|---|
| 3,128,461 | 4/1964 | Case, Jr. .......................... | 343/5 CE X |
| 3,560,974 | 2/1971 | Le Courtier et al. ........ | 343/5 SW X |
| 3,689,922 | 9/1972 | Phillips, Jr. .................. | 343/5 CF X |
| 3,849,780 | 9/1974 | Dynan ................................ | 343/7 A |
| 3,855,593 | 12/1974 | Van Hijfte et al. ............. | 343/5 VQ |
| 4,104,633 | 9/1978 | Donahue et al. .................... | 343/7 A |
| 4,137,532 | 1/1979 | Taylor, Jr. et al. ......... | 343/5 CF X |
| 4,148,025 | 4/1979 | Seiersen .......................... | 343/5 VQ |
| 4,159,477 | 6/1979 | Le Beyec ...................... | 343/5 CF X |
| 4,164,758 | 8/1979 | Kowal .............................. | 455/303 X |
| 4,355,312 | 10/1982 | Bosi et al. ........................ | 343/5 VQ |
| 4,360,811 | 11/1982 | Cantwell, Jr. et al. ...... | 343/5 CF X |
| 4,394,658 | 7/1983 | Short, III ........................ | 343/5 VQ |

FOREIGN PATENT DOCUMENTS 0066772  5/1980  Japan ............................... 343/5 SW

OTHER PUBLICATIONS

Merrill L. Skolnik, Introduction to Radar Systems, McGraw-Hill, Inc., 1980, New York, pp. 388-395.

Primary Examiner—Charles T. Jordan
Assistant Examiner—Brian S. Steinberger
Attorney, Agent, or Firm—Howard P. Terry; Seymour Levine

[57] ABSTRACT

An apparatus for removing correlated clutter introduced in radar video by standard video enhancers. A differencing network provides the difference between an enhanced radar video signal and the previous enhanced radar video signal appropriately weighted. This difference is a video signal with decorrelated clutter.

4 Claims, 2 Drawing Figures

RADAR VIDEO DEHANCER

BACKGROUND OF THE INVENTION

1. Field of the Invention

The invention pertains to radar target detection in a clutter environment and more particularly to the removal of clutter correlation introduced by a video enhancer in the video processing stage.

2. Description of the Prior Art

An important problem in the automatic detection and tracking of targets in air surveillance radars is the variation of false alarm rates with changing noise and clutter conditions. This problem has been the motivating force in the development of a multiplicity of constant false alarm rate (CFAR) receivers. One approach to CFAR processing is to use nonparametric techniques, such as the rank quantizer, wherein the signal level at the center tap of a tapped delay line is compared to the signal level at all other taps along the line, the rank of the central tap being the number of comparisons for which the signal amplitude at the tap is the greater of the two signal amplitudes. The rank obtained for the central tap after each transmitted pulse is then compared to a predetermined threshold and the number of ranks exceeding this threshold are summed after a number of transmitted pulses. The sum so obtained is then compared to a second threshold to determine a signal detection. Rank quantizers with post detection integration possess, CFAR characteristics, independent of noise and clutter distribution, for azimuthally uncorrellated noise and clutter.

Many air traffic surveillance site radars are commonly operated in the enhanced video mode. In this mode the radar video is fed through a video enhancer, prior to coupling the video to the display, that improves the target video while reducing the noise level. This process, however, adversely effects the CFAR characteristics by introducing significant azimuth clutter correllation, which may increase the false alarm rate to unacceptable levels. It is therefore desirable to provide a circuit to remove the azimuth clutter correllation introduced by the video enhancer.

SUMMARY OF THE INVENTION

A video dehancer for coupling between the radar video output terminals and the display unit of a radar system to substantially cancel clutter correlation introduced by the video enhancer in accordance with the present invention, includes a circuit wherein weighted signals of the video dehancer delayed by one pulse interval are subtracted from undelayed, unweighted signals to provide signals representative of the difference therebetween. The weighting factor is chosen to match the radar enhancer and may be selected to provide signals at the output terminal of the dehancer that are substantially equal to signals at the input of terminal of the video enhancer.

A second embodiment of the invention utilizes switches and inverters with the basic components found in both the enhancer and dehancer to establish a unit that is switchable between enhancing and dehancing modes.

DESCRIPTION OF THE PREFERRED EMBODIMENTS

Figure 1:
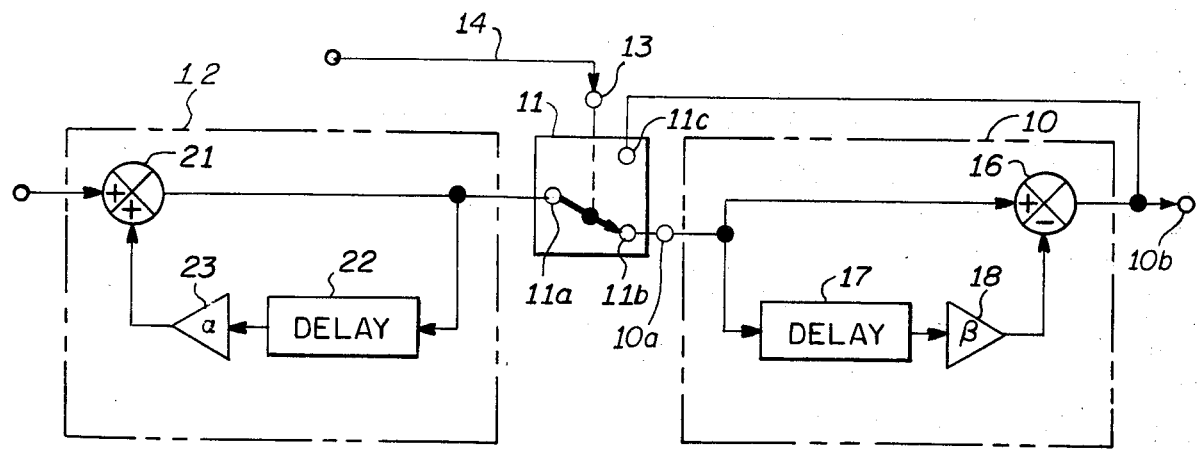
FIG. 1 is a schematic diagram of a video dehancer switchably coupled to a video enhancer.

Refer to FIG. 1 wherein a video dehancer 10 is coupled via switch 11 to a video enhancer 12. Output signals from the video enhancer are coupled to the wiper arm 11a of the switch 11 which is positioned by signals applied via line 14 to switch terminal 13 to couple the output signals from the video dehancer 12 to either switch terminal 11b or 11c. When the wiper arm is positioned to switch terminal 11c, the output terminals of video enhancer 12 are coupled to bypass the video dehancer 10 and are directly routed to the dehancer output terminal 10b.

When the switch is positioned to couple the output terminals of the video enhancer 12 to the switch terminal 11b, output signals of the video dehancer are coupled via the enhancer receiving terminal 10a to the positive input terminal of a differencing circuit 16 and via a delay line 17 and a weighting amplifier 18 to the negative input terminal of differencing circuit 16. Differencing circuit 16 provides a signal at the output terminal 10b that is representative of the difference between the delayed and undelayed signals coupled to the differencing circuit 16 from the receiving terminal 10a.

In the video enhancer 12, video signals are coupled to an input terminal of summing circuit 21, while the output terminal is coupled via a delay line 22, wherein the signals are delayed by one radar interpulse period, and weighting amplifier 23 to a second input terminal of summing circuit 21. If $\alpha$ is the weighting factor applied by the weighting amplifier 23, and it is assumed that the radar video is a sequence of substantially equal signals S at the interpulse radar period, it should be apparent that the steady state output signal $S_o$ of the video enhancer may be represented as a sequence of signals $S_o = S/(1-\alpha)$ at the radar interpulse period. Similarly, with the weighting factor $\beta$ applied by the weighting amplifier 18, the steady state output signal of the dehancer may be represented as a sequence of signals $$A_o = \frac{S(1-B)}{1-\alpha}.$$

It is readily apparent that when $B = \alpha$, $A_o = S$, and the output signal from the video dehancer 10 is substantially equal to the input signal to the video enhancer 12. Thus, $\beta$ may be selected to provide a desired overall signal output for the combination video enhancer-video dehancer.

Figure 2:
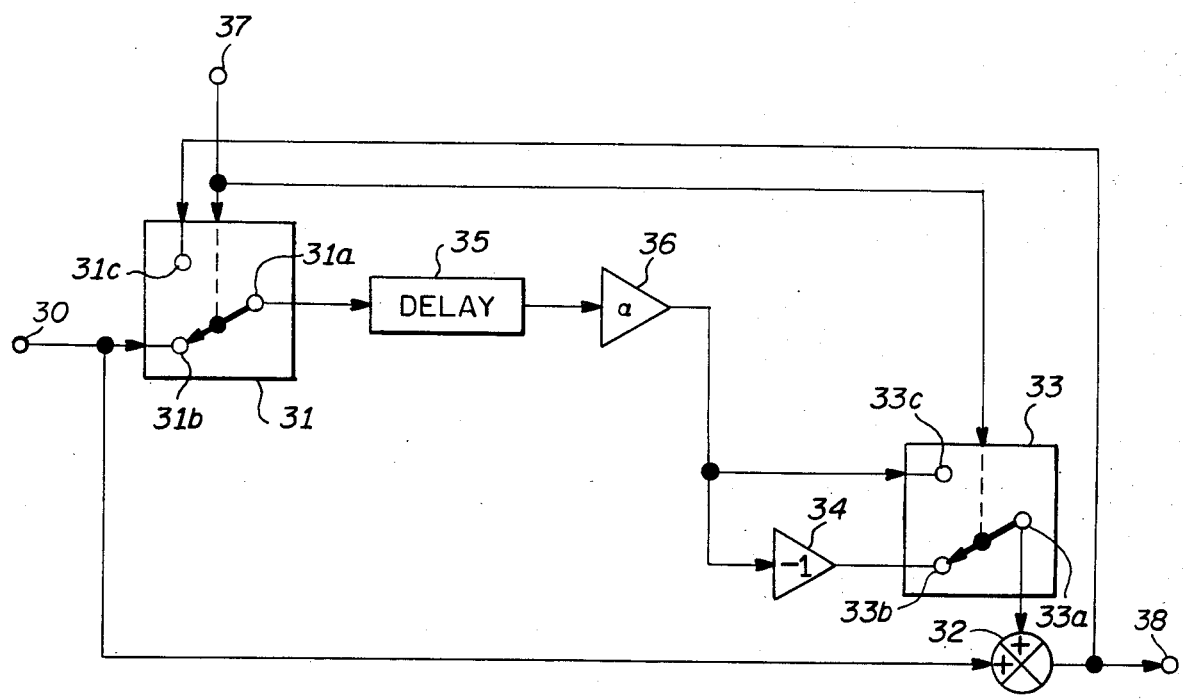
FIG. 2 is a schematic diagram of a circuit switchable between video enhancer and video dehancer modes of operation.

Refer now to FIG. 2, wherein a circuit operable as an enhancer-dehancer is shown. Radar video signals from a radar system may be received at input terminal 30 and coupled therefrom to a terminal 31b of switch 31 and to an input terminal of summing network 32 having a second input terminal coupled to the wiper arm 33a of switch 33. The output terminal of summing network 32 is coupled to terminal 31c of switch 31 and to output 38 of the enhancer-dehancer circuit. The wiper arm 31a of switch 31 is coupled to a terminal 33c of switch 33 via a delay line 35, wherein video signals are delayed by one radar interpulse period, and a weighting amplifier 36, wherein the delayed video signals are given a weight $\alpha$. The output terminal of weighting amplifier 36 is also coupled to the input terminal of an inverting amplifier 34, having an output terminal coupled to the terminal 33b of switch 33. When the switches 31 and 33, which are activated in unison by signals coupled to terminal 37, have their respective wiper arms 31a and 33a respectively coupled to terminals 31b and 33b it should be apparent that a video signal dehancer, such as the dehancer 10 of FIG. 1 is established. With the switches 31 and 33 in these positions, a signal received at input terminal 30 is coupled by delay line 35, weighting amplifier 36, and inverter 34 to an input terminal of summing network 32. By virtue of the signal inversion by inverter 34, summing network 32 provides a signal to the output terminal 38 that is representative of the difference between the delayed, weighted, and inverted signal at the output terminal of inverter 34 and the signal received at the input terminal 30 that is directly coupled to a second input terminal of the summation network 32. This difference signal is a video dehanced signal as previously discussed.

It should also be apparent that a video enhancer is established when the wiper arms 31a and 33a, of switches 31 and 33, are respectively coupled to terminals 31c and 33c. With switches 31 and 33 in these positions a signal received at input terminal 30 is coupled to one input terminal of the summing circuit 32, while a signal at the output terminal of the summing circuit 32 is coupled via a delay line 35, and a weighting amplifier 36 to a second input terminal of the summing circuit 32. Thus establishing a video enhancer as previously discussed.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. A radar video dehancer for partially and fully decorrelating signals at the output terminals of a video enhancer included in a pulse radar system to provide signals partially and fully equal to the signals coupled to the input terminals of the video enhancer comprising:
    signal input means coupled to receive enhanced video signals from said video enhancer;
    difference signal means having first input means coupled to said signal input means for receiving said enhanced video signals, second input means, and output means whereat difference signals are provided that are representative of differences between signals coupled to said difference signal first input means and signals coupled to said difference signal second input means;
    signal output means coupled to said difference signal output means;
    means coupled between said signal input means and said difference signal second input means for providing a time delay of one radar interpulse period; and
    means serially coupled to said time delay means, said signal input means, and said difference signal second input means for providing selectable weighting factors to signals coupled thereto, said selectable weighting factors arranged to provide a matching weighting factor that causes signals at said output means to be equal to signals at said input terminals of said video enhancer, whereby signals at said output means are video signals with reduced enhancement and thereby dehanced video signals.

2. A video dehancer for a pulse radar system having a video enhancer as recited in claim 1 further comprising switch means coupled between said video enhancer and said signal input means for switchably coupling signals from said video enhancer between said signal input means and said signal output means, said switch means having input means coupled to receive signals from said video enhancer, first output means coupled to said signal input means, and second output means coupled to said signal output means.

3. A switchable video enhancer-video dehancer having signal input means and signal output means and further comprising:
    first switch means having first input means, second input means, and output means for switchably coupling said first switch output means to said first switch first input means and said first switch second input means, said first switch first input means being coupled to said signal input means;
    second switch means having output means, first input means, and second input means for switchably coupling said second switch output means to said second switch first input means and said second switch second input means;
    sum means having output means coupled to said signal output means and said first switch second input means, first input means coupled to said signal input means, and second input means coupled to said second switch output means for providing sum signals at said sum output means, said sum signals being representative of signals at said signal input means summed with signals at said second switch output means;
    time delay means having input means coupled to said first switch output means and output means coupled to said second switch first input means for time delaying signals coupled therethrough; and
    polarity reversal means coupled between said time delay output means and said second switch second input means for providing signals to said second switch second input means having polarities opposite to polarities of signals at said time delay output means.

4. A switchable video enhancer-video dehancer in accordance with claim 3 further including:
    means serially coupled to said time delay means for providing selected weighting factors to signals coupled through said time delay means to establish a desired level of video enhancement cancellation.

* * * * *